April 9, 1935. O. WITTEL 1,997,328
GATE CONSTRUCTION FOR MOTION PICTURE MACHINES
Filed Feb. 19, 1931
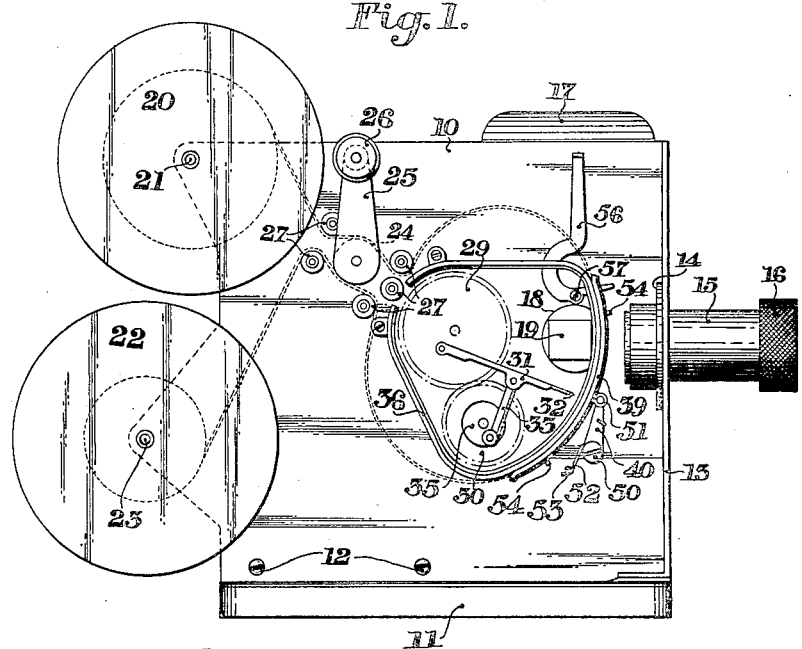
Inventor
Otto Wittel,
By
N M Perrin
George A. Gillette, Jr.
Attorneys Patented Apr. 9, 1935

1,997,328

UNITED STATES PATENT OFFICE 1,997,328

GATE CONSTRUCTION FOR MOTION PICTURE MACHINES

Otto Wittel, Rochester, N. Y., assignor to Eastman Kodak Company, Rochester, N. Y., a corporation of New York Application February 19, 1931, Serial No. 516,849

15 Claims. (Cl. 88—16)

The present invention relates to a gate construction for motion picture machines and more particularly to a gate construction for motion picture machines using film having laterally displaced rows of images progressive in opposite directions.

It has previously been proposed to close off the laterally adjacent unused row of images by means of a laterally sliding member magnetically actuated. It has also been suggested that light leakage to or through the adjacent frame may be greatly reduced or eliminated by staggering the apertures in the presser pad. Staggering said apertures in the presser pad requires two definite positions thereof corresponding to the direction of movement of the film. This movement of the presser pad to the desired positions has heretofore been accomplished manually or automatically through additional mechanical means.

The primary object of the present invention is the provision of a gate construction, the presser means of which is moved into proper position by frictional engagement with the film.

A further object of the invention is the provision of a stop means for limiting the movement of said presser means between two extreme positions.

Another object of the invention is the provision of a framing means which is operative in either of the extreme positions of the presser means to adjust the registry of one of the apertures therein with the images on the film.

A still further object of the invention is the provision of a resilient lever means which movably engages the presser means to hold the same in frictional engagement with the film.

Still another object of the invention is the provision of blackened flat grooves in the presser means to give sharp edges to the apertures therein and prevent the reflection of extraneous light from the presser means.

Other objects of the invention will be suggested by the following description to those skilled in the motion picture art.

The specific and other objects of the invention are embodied in a machine having a guideway provided with an exposure aperture, means for moving film longitudinally past said aperture and a presser means holding the film in the guideway, frictionally engaging and moved by said film. Stop means and framing means limit the movement of said presser means and permit adjustment of the presser pad in extreme positions respectively.

An embodiment of the invention is illustrated in the accompanying drawing wherein like elements are designated by the same reference numerals, and wherein:

Figure 1 is a side elevation of a motion picture projector showing the presser means in one extreme position.

Figure 2 is a perspective view of the guideway, presser means, film and resilient lever member, and Figure 3 is a transverse cross-section of the guideway, film and presser means.

The improved gate construction of the present invention is shown as applied to a motion picture projector, but it is to be understood that the gate construction may also be applied to motion picture cameras or other apparatus without exceeding the scope of the invention.

In the illustrated embodiment a vertical longitudinal partition 10 is attached to a base 11 by means of bolts 12. A front plate 13 is mounted perpendicularly to partition 10 and base 11 and supports an objective mount 14. The objective lens barrel 15 is threaded into mount 14, and has a knurled collar 16 to facilitate rotation of barrel 15 to focus the objective lens.

The light from lamp house 17 passes through hole 18 in partition 10 onto mirror 19 from whence the light is reflected through the objective lens barrel 15.

Film reels 20 and 22 are detachably mounted, respectively, on shafts 21 and 23 which are rotatably mounted in vertical longitudinal partition 10.

A sprocket wheel 24 is rotatably mounted in partition 10 and may be turned manually by a crank arm 25 and handle 26, or may be power driven, in opposite directions in known manner. A plurality of idle rollers 27 are also rotatably mounted in partition 10 near sprocket wheel 24 in order to properly maintain the film 28 against said sprocket wheel 24.

A pull down mechanism comprises intermeshing gears 29 and 30, a claw arm 31 eccentrically mounted at one end on gear 29, intermediately hinged to one end of a lever arm 33 and having a claw 32 adapted to engage the perforations 34 of film 28. The other end of lever arm 33 is eccentrically mounted upon the end of a drum 35 integral with gear 30 and a system of gears not shown, but of known construction, interconnects sprocket wheel 24 and gears 29 and 30.

A guideway 36 having an accurate front portion is attached to partition 10 to surround the pull down mechanism, has shoulders 37, see Fig. 3, adapted to engage and guide the edges of film 28 and has runners 40 adapted to make surface contact with the perforated sides of the film 28.

The path of the film 28 through the apparatus is shown in dotted lines from film reel 20, over sprocket wheel 24, in a loop around guideway 36 to pass exposure aperture 38 therein, under sprocket wheel 24 to film reel 22. This film advancing mechanism or any other suitable film advancing mechanism is deemed to be within the scope of the expression "means for moving a film longitudinally in either of opposite directions past said exposure aperture" which is used in the claims.

The previously described or equivalent elements for all types of motion picture apparatus are well known and per se form no part of the present invention.

A presser means such as a presser pad 39 has a longitudinally curved form with reversely curved ends, has runners 40 making surface contact with the perforated sides of film 28 and is provided with a slot 41 through which the claw 32 may move to engage film perforations 34. The presser means is provided with a plurality of transversely and longitudinally displaced flat grooves 42 and 43, while apertures 44 and 45 are located in the middle of the flat grooves 42 and 43, respectively. The thin edges of the apertures 44 and 45 and the flat grooves 42 and 43 are covered with lamp black lacquer or blackened in any suitable manner to prevent the reflection of light from these surfaces into the objective.

A central longitudinal rib 46 extends around the guideway 36 and across exposure aperture 38 while a second central longitudinal rib 47 is integral with presser pad 39. The ribs 46 and 47 are directly opposite each other and make contact with the center line of the film 28.

The presser means is resiliently held against the film by a resilient lever means so that runners 40 as well as rib 47 make surface contact with the film 28 to provide frictional engagement between the film and presser means. The other side of film 28 also makes surface contact with runners 48 and rib 46 so that the film is guided through and maintained in proper position between guideway 36 and presser pad 39.

The aforementioned resilient lever means is in movable engagement with said presser means and may comprise an arm 49 pivoted to partition 10 by a bolt 50, a roller 51 rotatably mounted on the free end of arm 49, and a coil spring 52 encircling the hub of arm 49 with one end engaging a stud 53 and the other end engaging one edge of arm 49. Thus the resilient means holds the presser means resiliently against the film 28 and the presser means moves in the same direction as the film by virtue of the frictional engagement therebetween.

The longitudinal movement of the presser means is limited by stop means such as a pair of pins 54 positioned on guideway 36 and protruding through slots 55 near one edge of presser pad 39. The pins 54 are so located and the slots 55 of such a length, that the presser pad 39 is halted in its movement with the film either with aperture 44 opposite one side of exposure aperture 38, or with aperture 45 opposite the other side of exposure aperture 38. The position of the presser pad when the film is traveling up is shown in full lines in Fig. 1 while the position of presser pad 39 when the film is traveling down is shown in Fig. 2.

The two extreme positions in which the stop means locate the presser means may not be such that the apertures 44 or 45 therein are in exact registry with the corresponding images on the film hence it is best to provide a framing means engaging said presser means and permitting slight variations in said extreme positions so that the images of the film will be properly framed with either of said apertures 44 and 45. A suitable framing means may consist of a bell crank 56 pivotally mounted on partition 10 by means of a bolt 57 so that one end of the bell crank 56 will move within or abut the ends of a slot 58 near the edge of presser pad 39. In order that the framing means will be operative in both extreme positions of the presser means, the slot 58 in presser pad 39 is shorter than slots 55 and the width of bell crank 56 is greater than the diameters of pins 54. Thus in either extreme position of the presser means the framing means may be operative to move the presser means, and if, in one extreme position of presser pad 39 the pins 54 abut the corresponding ends of slots 55, upon movement to the other extreme position the bell crank 56 will abut one end of slot 58 to stop the movement of presser pad 39 before pins 54 abut the other ends of slots 55.

The operation of the improved gate construction is as follows:

After the film is threaded through the motion picture apparatus, the sprocket wheel is hand or power driven to move the film loop around the guideway 36. The sprocket wheel 24 also drives the pull down mechanism through a system of gears of wellknown design, said pull down imparting an intermittent movement to the film in the loop. If the film in the loop is moving in a clockwise direction the frictional engagement between the presser means and the film will move the presser means to abut the stop means or framing means in extreme downward position illustrated in Fig. 2 in which position aperture 45 of the presser means is opposite one side of exposure aperture 38. If the aperture 45 does not properly frame the images on the right side of film 34 then the framing means may be operated to move the presser means into proper registry with said images.

At the end of the run or at any desired time, the direction of film movement may be reversed so that the film in the loop moves in a counter clockwise direction and the frictional engagement between the film and presser means will cause the same to move to the upper extreme position, shown in Fig. 1, abutting either the stop means or framing means. Again it may be necessary to adjust the presser means by operating the framing means so that the images on the left side of film 34 are properly framed within aperture 44 in the presser means.

The resilient means is operative at all times to hold the presser means against the film but to also allow the presser means to be moved by the frictional contact with the film. The use of the roller 51 in the resilient means provides rolling friction between the presser means and resilient means whereas sliding friction of much greater value than said rolling friction exists between said film and presser means so that movement of the presser means with the film is assured.

As many embodiments of the present invention are possible the present description is to be construed in an illustrative and not in a limiting sense.

Having now particularly described my invention, what I claim as new and desire to secure by Letters Patent of the United States is:

1. A motion picture machine comprising a guideway provided with an exposure aperture, an advancing means adapted to move a film in either of opposite directions past said exposure aperture, a presser means provided with a plurality of displaced exposure apertures, a supporting means maintaining said presser means in frictional engagement with said film, and for necessarily permitting said presser means to move in either direction with said film, and a stop means for limiting the movement of said presser means to locate one only of said displaced exposure apertures in registry with the first mentioned exposure aperture.

2. A motion picture machine comprising a guideway provided with an exposure aperture, an advancing means adapted to move a film intermittently in either of opposite directions past said exposure aperture, a presser means provided with a pair of longitudinally displaced exposure apertures, a resilient member pressing said presser means against said film and for necessarily permitting said presser means to move in either direction with said film, and a stop means for limiting the movement of said presser means to locate one only of said displaced exposure apertures in registry with the first mentioned exposure aperture.

3. A motion picture machine comprising a guideway provided with an exposure aperture, an advancing means adapted to move a film intermittently in either of opposite directions past said exposure aperture, a presser means provided with a pair of longitudinally and laterally displaced exposure apertures, a supporting means solely supporting said presser means in frictional engagement with said film and for necessarily permitting said presser means to move in either direction with said film, and a stop means for limiting the movement of said presser means with the film to locate one only of said displaced exposure apertures in registry with the first mentioned exposure aperture.

4. A motion picture machine comprising a guideway provided with an exposure aperture, an advancing means adapted to move a film in either of opposite directions past said exposure aperture, a presser means provided with an elongated slot and with a plurality of displaced exposure apertures, a supporting means supporting said presser means in frictional engagement with said film and for necessarily permitting said presser means to move in either direction with said film, and a pin cooperating with said elongated slot to limit the movement of said presser means with the film and to locate one only of said displaced exposure apertures in registry with the first mentioned exposure aperture.

5. A motion picture machine comprising a guideway provided with an exposure aperture, an advancing means adapted to move a film having image frames in either of opposite directions past said exposure aperture, a presser means provided with a plurality of longitudinally displaced exposure apertures, a supporting means supporting said presser means in frictional engagement with said film and for necessarily permitting said presser means to move in either direction with said film, a stop means for limiting the movement with said film of said presser means between extreme positions and to locate one only of said displaced exposure apertures in registry with the first mentioned exposure aperture and a framing means cooperating with said presser means for moving the same in either extreme position in a direction opposite to the film movement to locate one displaced exposure aperture in exact registry with the frames on said film.

6. A motion picture machine comprising a guideway provided with an exposure aperture, an advancing means adapted to move a film having image frames in either of opposite directions past said exposure aperture, a pressure means provided with an elongated slot and a plurality of laterally and longitudinally displaced exposure apertures, a supporting means supporting said presser means in frictional engagement with said film and for necessarily permitting said presser means to move in either direction with said film, a stop means for limiting the movement with said film of said presser means between extreme positions and to locate one only of said displaced exposure apertures in registry with the first mentioned exposure aperture, and a framing lever cooperating with the elongated slot in said presser means for moving the same in either extreme position in a direction opposite to the film movement to locate one displaced exposure aperture in exact registry with the image frames on said film.

7. A motion picture machine comprising a guideway provided with an exposure aperture, an advancing means adapted to move a film having image frames in either of opposite directions past said exposure aperture, a presser pad provided with a pair of longitudinally extending elongated slots of unequal length and with a pair of longitudinally displaced exposure apertures, a supporting means supporting said presser means in frictional engagement with said film and for necessarily permitting said presser means to move in either direction with said film, a pin cooperating with the longer elongated slot to limit the movement with said film of said presser means between two extreme positions and a framing lever cooperating with the shorter elongated slot to move the presser means while in either extreme position in a direction opposite to the film movement to locate one of the displaced exposure apertures in registry with the image frames on said film.

8. A motion picture machine comprising a guideway provided with an exposure aperture, an advancing means adapted to move a film in either of opposite directions past said exposure aperture, a presser pad provided with a pair of displaced exposure apertures, a resilient means providing the sole support for said presser pad and including a roller which bears against said presser pad and which necessarily permits said presser pad to move in either direction with said film, and a stop means for limiting the movement with said film of said presser pad to locate one only of said displaced exposure apertures in registry with the first mentioned exposure aperture.

9. A motion picture machine comprising a guideway provided with an exposure aperture, an advancing means adapted to move a film having image frames in either of opposite directions past said exposure aperture, a longitudinally curved presser pad provided with a pair of displaced flat grooves and with displaced exposure apertures centrally located in respective grooves, a supporting means supporting said presser means in frictional engagement with said film and for necessarily permitting said presser means to move in either direction with said film, and a stop means for limiting the movement with the film of said presser means to locate one only of said displaced exposure apertures in registry with the first mentioned exposure aperture.

10. A motion picture machine comprising a guideway provided with an exposure aperture, an advancing means adapted to move a film having image frames in either of opposite directions past said exposure aperture, a longitudinally curved presser pad provided with a pair of laterally and longitudinally displaced flat grooves having blackened surfaces and with displaced exposure apertures centrally located in respective grooves, a supporting means supporting said presser means in frictional engagement with said film and for necessarily permitting said presser means to move in either direction with said film, and a stop means for limiting the movement with said film of said presser means to locate one only of said displaced exposure apertures in registry with the first mentioned exposure aperture.

11. In a motion picture machine, the combination with a gate for guiding a film and including a presser member which is provided with an aperture, and an advancing means for moving said film in either of opposite directions through said gate, of a means supporting said presser member in frictional engagement with said film and for permitting limited movement of said presser member by the film and in the direction of film movement.

12. In a motion picture machine, the combination with a gate for guiding a film and including a presser member which is provided with an aperture for registering with areas on said film, and an advancing means for moving said film in either of opposite directions through said gate, of a means supporting said presser member in frictional engagement with said film and with said aperture in a predetermined position and for permitting limited movement of said presser member by the film and in the direction of film movement to move said aperture out of said predetermined position.

13. A motion picture machine comprising an optical system, a gate for guiding a film and including a presser member which is provided with an exposure aperture in optical relation to said optical system, an advancing means for moving said film in either of opposite directions through said gate, and a supporting means for maintaining said presser member in frictional engagement with said film, characterized by said supporting means also permitting limited movement of said presser member by the film and in the direction of film movement to move said aperture out of optical relation with said optical system upon reversal in the direction of said film movement.

14. A motion picture machine comprising an optical system, a gate for guiding a film and including a presser member which is provided with an exposure aperture out of optical relation to said optical system, an advancing means for moving said film in either of opposite directions through said gate, and a supporting means for maintaining said presser member in frictional engagement with said film, characterized by said supporting means also permitting limited movement of said presser member by the film and in the direction of film movement to move said aperture into optical relation with said optical system upon reversal in the direction of said film movement.

15. In a motion picture machine, the combination with a gate for guiding a film and including a presser member which is provided with an aperture, and an advancing means for moving said film in either of opposite directions through said gate, of a supporting means for maintaining said presser member in frictional engagement with said film and for permitting movement of said presser member by the film and in the direction of film movement, and a stop means for engaging said presser member and for limiting the movement thereof with said film.

OTTO WITTEL.